July 1, 1958  F. K. H. NALLINGER  2,841,233
ARRANGEMENT OF INSTRUMENTS IN A MOTOR VEHICLE
Filed Oct. 11, 1954  3 Sheets-Sheet 1
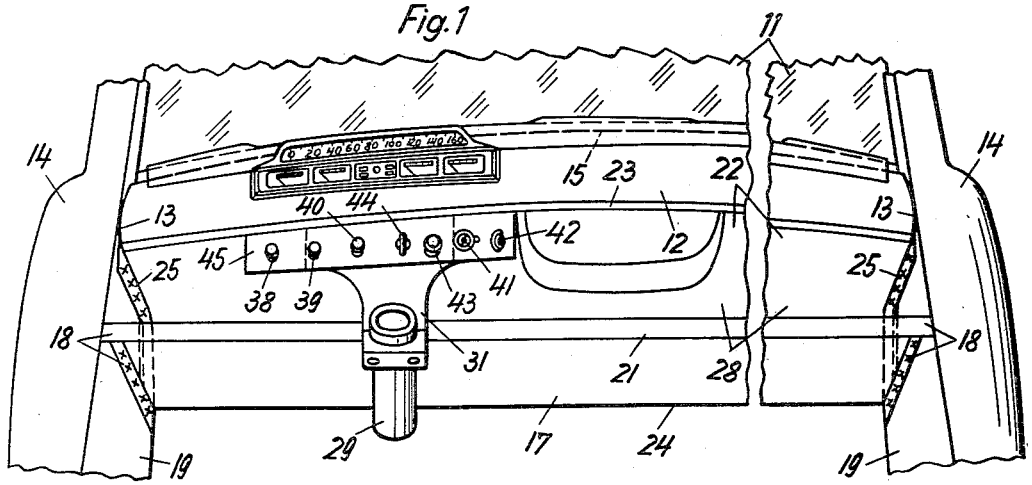
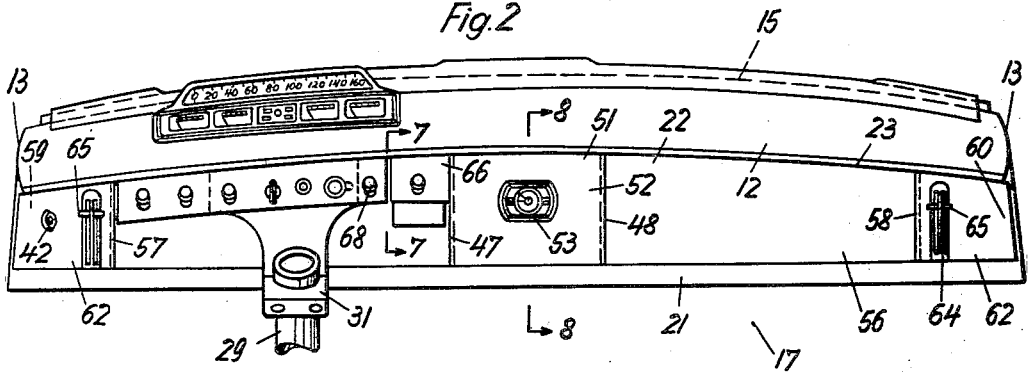
INVENTOR
FRIEDRICH K. H. NALLINGER
BY Dicke and Craig.
ATTORNEYS

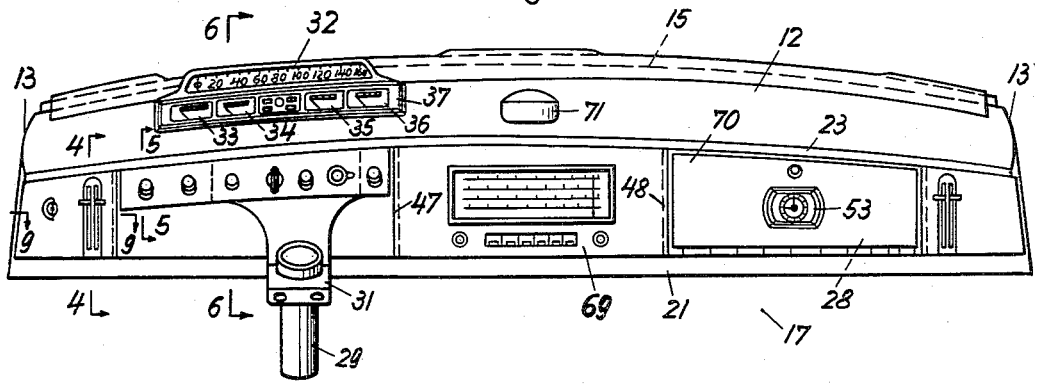
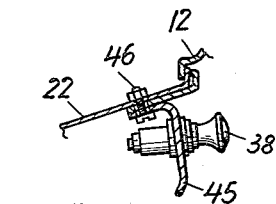
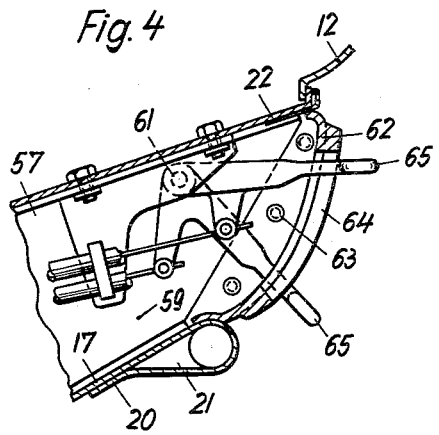
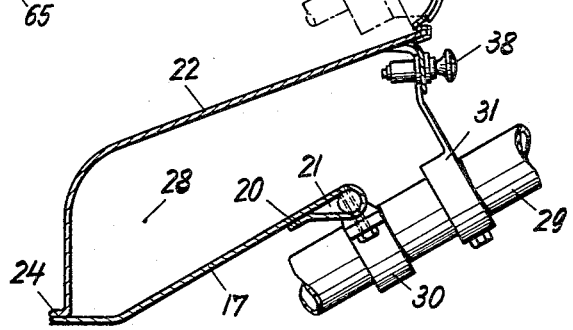

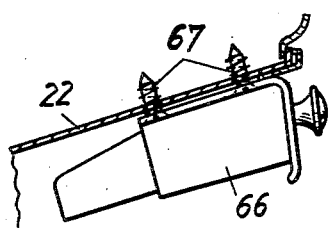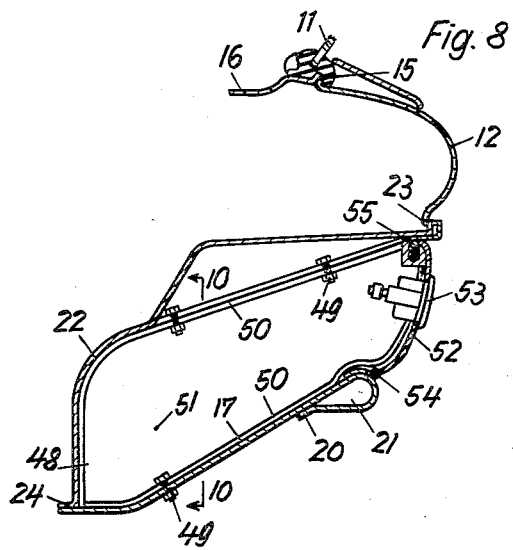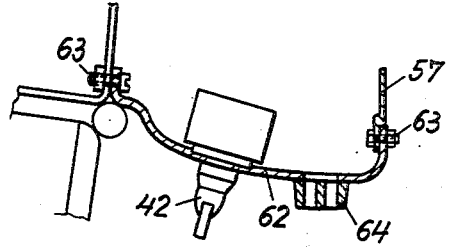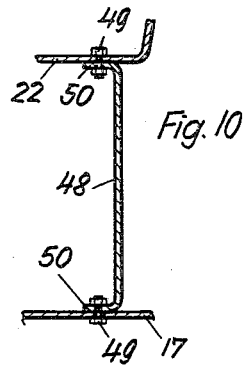

United States Patent Office 2,841,233
Patented July 1, 1958

2,841,233

ARRANGEMENT OF INSTRUMENTS IN A MOTOR VEHICLE

Friedrich K. H. Nallinger, Stuttgart, Germany, assignor to Daimler-Benz Aktiengesellschaft, Stuttgart-Unterturkheim, Germany Application October 11, 1954, Serial No. 461,473

12 Claims. (Cl. 180—90)

The present invention relates to a new assembly and mounting for the controls, accessories and other appliances to automobiles.

The increasing number of different items of equipment which are either necessary for operating modern cars of different makes or models or which are desired by different car buyers render the assembly more and more difficult. Also, the mass production of cars for export to various countries becomes more and more uneconomical since it is for many reasons impossible to standardize such equipment both as to the number of individual items as well as to their arrangement and manner of mounting.

At one time in the past when car bodies were produced more individually by skilled labor, a carriage builder was easily able to comply with all the special wishes and requirements of his individual customers concerning the equipment of a vehicle by installing the various items desired in the instrument panel or dashboard in the individual car after it had otherwise been assembled and completed by subsequently providing the necessary openings in such panel or dashboard which in most cases even consisted of wood, or by building an entire instrument panel in the desired design and mounting it subsequently in the car body. Such manufacturing methods are, however, no longer possible for economical and other reasons in modern mass production of car bodies made of smaller stamped parts since the dashboards which are built of sheet metal and plastic material by means of expensive dies must necessarily be of standard design, particularly because they usually constitute a reinforcing element of the car body which does not permit any subsequent changes or only at considerable expense.

It is an object of the present invention to create an instrument panel or dashboard for an automobile or similar vehicle which is more easily adaptable for the assembly and installation of control instruments, accessories and other appliances without affecting the solidity and rigidity of the front wall of the car body or requiring any difficult or time-consuming changes to be made.

For carrying out the above object, the present invention resides primarily in the combination of the following features, some of which have previously been known as individual features, which, by being combined with the one another result in particular advantages previously unknown:

a. The control instruments usually required in a similar combination in any car for operating the same, such as the speedometer, the oil pressure gauge, the water thermometer, the fuel gauge, and the like are mounted in a cross member in front of the steering wheel below the windshield and rigidly secured to the side walls of the car body so as to act as a brace thereof.

b. The steering column of the car carrying the steering wheel and, if desired, also the gear shift mechanism, is secured to a transverse wall which is substantially horizontal or slightly forwardly and downwardly inclined and located below and spaced from the above-mentioned cross member. This transverse wall is likewise rigidly secured to the side walls of the car body so as to constitute a substantial reinforcement thereof and also forms the bottom of a compartment extending along the entire width of the car for storing therein any loose objects, or forming the space for installing any additional control instruments or auxiliary appliances.

c. The control instruments and other appliances which are not required for the actual operation of the car and may be installed therein in various combinations and shapes, i. e. a radio receiver, a clock, the controls of a heating and ventilating system, and the like, are mounted in wall parts which close the mentioned compartment toward the front seats of the car and each of which is secured to the cross member and the transverse wall so as to be detachable therefrom.

Further objects, features, and advantages of the present invention will appear from the following detailed description thereof and the accompanying drawings, in which Fig. 1 illustrates the basic design of an automobile dash board as seen from the front seat thereof, on which are mounted the instruments, appliances, and elements for operating the car;

Fig. 2 shows a possible adaptation of the basic design as shown in Fig. 1, whereby the dashboard equipment may be supplemented.

Figure 3 shows a possible adaptation of the basic design as shown in Figure 1 whereby the dashboard equipment may be supplemented by additional appliances over those shown in Figure 2;

Figure 4 is a cross sectional view taken along lines 4—4 of Figure 3;

Figure 5 is a cross sectional view taken along line 5—5 of Figure 3;

Figure 6 is a cross sectional view taken along line 6—6 of Figure 3;

Figure 7 is a cross sectional view taken along line 7—7 of Figure 2;

Figure 8 is a cross sectional view taken along line 8—8 of Figure 2;

Figure 9 is a cross sectional view taken along line 9—9 of Figure 3, and

Figure 10 is a cross sectional view taken along line 10—10 of Figure 8.

Referring to the drawings, a cross member 12 made of stamped sheet metal and bulging toward the interior of the car below the windshield 11, is securely welded with its lateral edges 13 to the front posts 14 and its upper edge at 15 to the windshield support 16 of the car frame. A certain distance below the cross member 12 a second cross member 17 forms a substantially straight, forwardly and downwardly inclined wall 17, the lateral edges 18 of which are likewise securely connected to the front posts 14 and the side walls 19 of the car body, and the rear edge 20 of which is bent over backward and welded to the straight wall 17 so as to form a closed hollow beam 21. The cross member 12 is connected to the cross member 17 by a wall 22 of angular cross section, the rear edge of which is securely welded at 23 to the lower edge of the cross member 12, while its front edge is welded at 24 to the transverse wall 17 and its lateral edges at 25 to the side walls 19 of the front part of the car body.

The transverse wall 17 also forms the bottom of a compartment 28 which is closed in forward and upward directions by the wall 22 and extends over the entire width of the car body. This compartment 28 is intended to hold loose articles needed by the driver and may also be used for mounting therein auxiliary instruments and appliances, as will be subsequently described in detail. Although this compartment is not closed off toward the front seats by a solid wall in the form of the usual dash board or instrument panel, the parts 12, 17, and 22 which are welded to the lateral walls of the car body constitute an adequate transverse reinforcement of the front wall of the car body holding the windshield 11.

The steering column 29 carrying the steering wheel (not shown) and, depending upon the design of the car, possibly also the gear shift mechanism, is detachably mounted by means of a clamping ring 30 on the transverse wall 17 and by another clamping element 31 on the cross member 12 so that the steering column itself forms a bracing element for the parts 12 and 17.

The usual control instruments necessary for the operation of the car, such as the speedometer 32, the fuel gauge 33, the mileage gauge 34, the water thermometer 35 and the oil pressure gauge 36, are combined in an insert 37 and mounted as a self-contained unit above the steering column 29 within the cross member 12.

The switches for the electric appliances, i. e. for example, the pull switches 38 and 39 for the ceiling light and the windshield wiper, the starter switch 40, the ignition switch 41 which may be combined with a steering lock, and the switch 42 for the outside lights, as well as the control buttons 43 and 44 for other appliances, such as the starting carburetor choke, the manual spark control and the like, are mounted in a control board 45 which is secured by bolts 46 on the lower side of the cross member 12 so as to be easily detached therefrom. Thus, the control board 45 may also be mounted at any other desired place, that is, either farther to the right or the left of the place shown in Fig. 1, or be exchanged for another board with a larger or smaller number of control buttons without requiring any extensive changes on any parts of the front wall which are permanently secured to the car body.

The assembly illustrated in Fig. 1 corresponds to the standard equipment of a car with all the necessary instruments, appliances, and control devices. Any other parts which a customer might wish to have to supplement the equipment may be mounted in the space between the cross member 12 and the transverse wall 17 as subsequently described and illustrated by way of an example in Figs. 2 and 3. The particular arrangement of the supporting members 12 and 17 permits a large variety of such supplementary appliances to be installed.

Fig. 2 further shows at the right and left sides of the center of the car a pair of vertical separating walls 47 and 48 extending between the cross member 12, the wall 22, and the cross member 17 in a direction longitudinally of the car. These walls 47 and 48 are secured by bolts 49 passing through flanged portions 50 therein, as diagrammatically illustrated in Fig. 10, so as to be easily mounted or detached. The central compartment 51 thus formed by the separating walls 47 and 48, also illustrated in Fig. 8, is closed toward the front seats by a hinged cover 52, in which a clock 53 is mounted. At its lower edge, the cover 52 is pivotally secured to the hollow beam part 21 of the transverse wall 17 by means of a hinge 54 and provided at its upper edge with a ball lock 55. If desired, the right separating wall 48 may also be omitted and the cover 52 be rigidly secured to the cross member 12 and the transverse wall 17 so as to permit access to the compartment 51 behind the cover 52 through the opening 56 in the compartment 28. Obviously, the opening 56 in the compartment may also be provided with a hinged cover similar to cover 52 to close, and possibly lock, the compartment 28.

As shown in Fig. 2, near the side walls of the car body two additional longitudinal walls 57 and 58 are subsequently installed which are designed and secured similar to walls 47 and 48. The narrow compartments thus formed separately of the main compartment 28 are used for housing the lever system 61 (Fig. 4) for operating the control flaps of the heating and ventilating mechanism of the car if such equipment should be additionally desired. In such event, the compartments 59 and 60 are closed toward the front seats by wall sections 62 which, as shown in Fig. 9, are secured to the front posts 14 and the side walls 57 and 58 by bolts 63, and are provided with guide slots 64 for guiding the control levers 65 of the heating and ventilating mechanism.

The embodiment of the invention shown in Fig. 2 further deviates from that shown in Fig. 1 by the control board 45' being moved farther outwardly so that its left side substantially abuts against the separating wall 57, and the space thus left vacant between its right end and the separating wall 47 may be used for mounting an ash tray 66 which is secured to the lower side of the wall section 22 by screws 67. For this purpose, in the modified embodiment of the invention as shown in Fig. 2, the switch 42 for the outside lights in the control board 4 will be replaced by a cigarette lighter 68 and be mounted instead in the left wall section 62.

In the embodiment of the invention shown in Fig. 3, as compared with Fig. 2, the ash tray 66 is omitted and the separating walls 47 and 48 are further moved apart so as to provide sufficient space for a radio receiver 69. The advantage of the interchangeability of the various parts of the entire assembly resulting from the fact that the separating walls 47 and 48 are easily disconnected and shifted to another point will then become particularly apparent since buyers of automobiles, especially those in different countries, express very different wishes as to the make, type, and size of the radio receivers for their cars. The clock 53 may be mounted in this case in the hinged cover 70 of the right part of the compartment 28, which may be of similar design as the cover 52 in Fig. 2, and, if necessary, or desired, a different kind of ash tray 71 may be mounted on the cross member 12.

The above description of the various modifications of the invention already indicates that the possibility, according to the invention, of assembling and interchanging various individual parts of equipment or equipment sets will make it possible to satisfy the most differing wishes and requirements of car buyers as to the type and location of the various parts, and that the changes to be made in order to comply with any such special wishes only consist in drilling a few holes which are hidden from view for mounting or shifting the various parts. Such minor changes can thus be carried out in any small workshop, particularly since the individual parts which might be exchanged may be prefabricated and readily obtainable from the manufacturer of the car.

While the foregoing description sets forth in detail what I regard as the preferred embodiments of my invention, it is to be understood that numerous changes may be made therein without departing from the spirit and scope of the invention as defined in the appended claims.

Having thus described my invention, what I claim as new is:

1. In a motor vehicle, the combination of a body portion located in front of the driver's heat and connecting the side walls of the vehicle, said body portion comprising an upper cross member, a lower cross member located below said upper cross member and spaced therefrom, an intermediate wall connecting said upper and lower cross members so that said two cross members and said intermediate wall form an instrument wall assembly substantially of S-like cross section projecting rearwardly in the upper part and forwardly in the lower part of said wall assembly and a compartment in the lower part thereof extending transversely to the vehicle below said upper cross member, and instruments detachably mounted in said upper cross member.

2. In a motor vehicle, the combination of a body portion located in front of the driver's seat and connecting the side walls of the vehicle, said body portion comprising an upper cross member, a lower cross member located below said upper cross member and spaced therefrom, an intermediate wall connecting said upper and lower cross members so that said two cross members and said intermediate wall form an instrument wall assembly substantially of S-like cross section projecting rearwardly in the upper part and forwardly in the lower part of said wall assembly and a compartment in the lower part thereof extending transversely to the vehicle below said upper cross member, instruments detachably mounted in said upper cross member, and a steering column connected to one of said cross members.

3. In a motor vehicle, the combination as defined in claim 1, further comprising appliances detachably mounted in said compartment.

4. In a motor vehicle, the combination as defined in claim 2, further comprising means for securing said steering column to both said upper and lower cross members.

5. In a motor vehicle, the combination of a body portion in front of the driver's seat and connecting the side walls of said vehicle, said body portion comprising an upper cross member projecting substantially rearwardly and towards the interior of said vehicle, a lower cross member located below said upper cross member, an angular intermediate wall connecting said upper cross member and said lower cross member in such a manner that said two cross members and said angular intermediate wall form a compartment extending transversely to the longitudinal axis of said vehicle, said angular intermediate wall forming the rear wall of said compartment, instruments detachably mounted in said upper cross member, and appliances detachably mounted in said compartment.

6. In a motor vehicle, the combination as defined in claim 5, wherein said instruments at least comprise a speedometer and a gauge, and are mounted as a self-contained unit in said upper cross member.

7. In a motor vehicle, the combination as defined in claim 5, further comprising substantially vertical transverse walls subdividing said compartment, and at least one hinged cover for opening and closing at least a part of said subdivided parts.

8. In a motor vehicle, the combination as defined in claim 5, further comprising electrical control elements, a boardlike member carrying said control elements and secured to the lower side of said upper cross member.

9. In a motor vehicle, the combination as defined in claim 5, further comprising separating walls subdividing said compartment, and means for detachably securing said separating walls to said cross members.

10. In a motor vehicle, the combination as defined in claim 5, further comprising separating walls subdividing said compartment and having angularly bent edges, and means for detachably securing said edges to said lower cross member and said angular wall.

11. In a motor vehicle, the combination as defined in claim 5, wherein said cross members and said angular intermediate wall are comprised of sheet metal plates welded together as a unit as well as to said side walls of said vehicle.

12. In a motor vehicle, the combination of a body portion in front of the driver's seat and connecting the side walls of said vehicle, said body portion comprising an upper cross member projecting substantially rearwardly and towards the interior of said vehicle, a lower cross member located below said upper cross member and connected to said upper cross member so as to form a compartment extending transversely to the longitudinal axis of said vehicle, instruments detachably mounted in said upper cross member, appliances detachably mounted in said compartment, a forwardly and downwardly inclined steering column, an angular intermediate wall connecting said upper and lower cross members and forming the rear wall of said compartment, the bottom wall of said compartment being formed by the part of said angular intermediate wall connected to said upper cross member and said lower cross member, and both said part of said angular intermediate wall and said lower cross member being forwardly and downwardly inclined and substantially parallel to the axis of said steering column.

References Cited in the file of this patent

UNITED STATES PATENTS

| | | |
|---|---|---|
| 1,048,900 | Sheppy et al. | Dec. 31, 1912 |
| 1,353,427 | Seguin | Sept. 21, 1920 |
| 1,368,959 | Moller | Feb. 15, 1921 |
| 1,445,181 | Sizaire | Feb. 13, 1923 |
| 1,502,344 | Murray | July 22, 1924 |
| 1,789,109 | Moesta | Jan. 13, 1931 |
| 1,823,156 | McDowell et al. | Sept. 15, 1931 |
| 1,902,802 | Hobbs | Mar. 21, 1933 |
| 2,605,687 | Scott | Aug. 5, 1952 |

FOREIGN PATENTS

| | | |
|---|---|---|
| 728,111 | Germany | Nov. 20, 1942 |